US008046547B1

(12) United States Patent
Chatterjee et al.

(10) Patent No.: US 8,046,547 B1
(45) Date of Patent: Oct. 25, 2011

(54) STORAGE SYSTEM SNAPSHOTS FOR CONTINUOUS FILE PROTECTION

(75) Inventors: Paresh Chatterjee, Fremont, CA (US); Srikumar Subramanian, Fremont, CA (US); Suresh Grandhi, Fremont, CA (US); Narayanaswami Ganapathy, Fremont, CA (US)

(73) Assignee: American Megatrends, Inc., Norcross, GA (US)

( * ) Notice: Subject to any disclaimer, the term of this patent is extended or adjusted under 35 U.S.C. 154(b) by 770 days.

(21) Appl. No.: 12/013,099

(22) Filed: Jan. 11, 2008

Related U.S. Application Data

(60) Provisional application No. 60/898,325, filed on Jan. 30, 2007.

(51) Int. Cl.
G06F 13/00 (2006.01)
G06F 13/28 (2006.01)
G06F 7/00 (2006.01)
G06F 17/00 (2006.01)

(52) U.S. Cl. ............ 711/162; 711/E12.003; 707/649; 707/657

(58) Field of Classification Search .............. 711/162, 711/E12.103; 707/649, 657
See application file for complete search history.

(56) References Cited

U.S. PATENT DOCUMENTS

| | | | |
|---|---|---|---|
| 4,942,579 A | 7/1990 | Goodlander et al. | |
| 5,257,367 A | 10/1993 | Goodlander et al. | |
| 5,530,850 A | 6/1996 | Ford et al. | |
| 5,604,862 A | 2/1997 | Midgely et al. | |
| 5,720,027 A | 2/1998 | Sarkozy et al. | |
| 5,732,238 A | 3/1998 | Sarkozy | |
| 5,790,774 A | 8/1998 | Sarkozy | |
| 5,893,919 A | 4/1999 | Sarkozy et al. | |
| 6,098,128 A | 8/2000 | Velez-McCaskey et al. | |
| 6,298,425 B1 | 10/2001 | Whitaker et al. | |
| 6,311,193 B1 | 10/2001 | Sekido | |
| 6,434,681 B1 | 8/2002 | Armangau | |
| 6,460,054 B1 | 10/2002 | Grummon | |
| 6,484,186 B1 * | 11/2002 | Rungta .................. | 1/1 |
| 6,487,561 B1 | 11/2002 | Ofek et al. | |
| 6,665,815 B1 | 12/2003 | Goldstein et al. | |
| 6,671,757 B1 | 12/2003 | Mutler et al. | |
| 6,694,336 B1 | 2/2004 | Mutler et al. | |
| 6,748,504 B2 | 6/2004 | Sawdon et al. | |

(Continued)

OTHER PUBLICATIONS

U.S. Appl. No. 12/472,858 filed May 27, 2009 entitled "Continuous Data Protection of Files Stored on a Remote Storage Device", Inventors: Chatterjee et al.

(Continued)

*Primary Examiner* — Edward J Dudek, Jr.
(74) *Attorney, Agent, or Firm* — McKeon Meunier Carlin & Curfman, LLC

(57) ABSTRACT

Techniques for continuous data protection can include creating snapshots of one or more underlying storage volumes upon specific file system events. Generating snapshots upon every file close event can protect the files in a storage system by keeping a snapshot of every version or modification of each file. Removal of redundant snapshots can mitigate the impact on storage capacity associated with creating these large numbers of volume snapshots upon each file close event. Additionally, file closure lists can be employed to allow generating snapshots only when a previously closed file is reopened. Such an approach can protect the previous version of a file prior to the opening of a new version of the file. Such an approach can also mitigate storage capacity impact without the creation of redundant snapshots.

14 Claims, 7 Drawing Sheets

U.S. PATENT DOCUMENTS

| | | | |
|---|---|---|---|
| 6,892,211 B2 | 5/2005 | Hitz et al. | |
| 6,934,727 B2 | 8/2005 | Berkowitz et al. | |
| 7,072,916 B1 | 7/2006 | Lewis et al. | |
| 7,111,026 B2 | 9/2006 | Sato | |
| 7,225,210 B2 | 5/2007 | Guthrie, II. | |
| 7,243,115 B2 | 7/2007 | Manley et al. | |
| 7,363,444 B2 | 4/2008 | Ji | |
| 7,373,366 B1 | 5/2008 | Chatterjee et al. | |
| 7,415,486 B2 | 8/2008 | Mutler | |
| 7,457,980 B2 | 11/2008 | Yang et al. | |
| 7,555,504 B2 | 6/2009 | Bixby et al. | |
| 7,603,391 B1 * | 10/2009 | Federwisch et al. | 1/1 |
| 7,617,217 B1 | 11/2009 | Chen et al. | |
| 7,707,183 B2 | 4/2010 | Alstrin et al. | |
| 2002/0029227 A1 | 3/2002 | Mutler et al. | |
| 2002/0040369 A1 | 4/2002 | Mutler et al. | |
| 2003/0126242 A1 | 7/2003 | Chang | |
| 2004/0030727 A1 | 2/2004 | Armangau et al. | |
| 2004/0128470 A1 | 7/2004 | Hetzler et al. | |
| 2005/0228957 A1 | 10/2005 | Satoyama et al. | |
| 2005/0246503 A1 | 11/2005 | Fair | |
| 2006/0206542 A1 | 9/2006 | Wolfgang et al. | |
| 2006/0218364 A1 | 9/2006 | Kitamura | |
| 2006/0236047 A1 | 10/2006 | Shitomi | |
| 2007/0150677 A1 | 6/2007 | Homma et al. | |
| 2007/0174690 A1 | 7/2007 | Kambara et al. | |
| 2007/0185940 A1 | 8/2007 | Prahlad et al. | |
| 2007/0226730 A1 | 9/2007 | Coyle et al. | |
| 2007/0266066 A1 | 11/2007 | Kapoor et al. | |
| 2008/0010308 A1 | 1/2008 | Erdogan et al. | |
| 2008/0010322 A1 * | 1/2008 | Lee et al. | 707/201 |
| 2008/0052480 A1 | 2/2008 | Satoyama et al. | |
| 2008/0104139 A1 | 5/2008 | Xu et al. | |
| 2008/0104443 A1 | 5/2008 | Akutsu et al. | |
| 2008/0183973 A1 | 7/2008 | Aguilera et al. | |
| 2008/0244205 A1 | 10/2008 | Amano et al. | |
| 2009/0044046 A1 | 2/2009 | Yamasaki | |
| 2009/0055608 A1 | 2/2009 | Yamasaki | |

OTHER PUBLICATIONS

Peterson et al. "Ext3cow: A Time-Shifting File System for Regulatory Compliance," ACM Transactions on Storage, vol. 1, No. 2, May 2005, pp. 190-212.

Rosenblum et al., "The Design and Implementation of a Log-Structured File System," ACM Transactions on Computer Systems, vol. 10, No. 1, Feb. 1992, pp. 26-52.
U.S. Official Action dated Aug. 4, 2006 in U.S. Appl. No. 11/255,146.
U.S. Official Action dated Nov. 17, 2006 in U.S. Appl. No. 11/255,146.
U.S. Official Action dated Aug. 22, 2007 un U.S. Appl. No. 11/255,146.
U.S. Notice of Allowance / Allowability dated Dec. 11, 2007 in U.S. Appl. No. 11/255,146.
U.S. Appl. No. 11/255,146, filed Oct. 20, 2005, entitled "Method, System, Apparatus, and Computer-Readable Medium for Taking and Managing Snapshots of a Storage Volume," Inventors: Chatterjee et al.
U.S. Appl. No. 12/042,705, filed Mar. 5, 2008, entitled "Method, System, Apparatus, and Computer-Readable Medium for Taking and Managing Snapshots of a Storage Volume," Inventors: Chatterjee et al.
U.S. Appl. No. 12/042,710, filed Mar. 5, 2008, entitled "Method, System, Apparatus, and Computer-Readable Medium for Taking and Managing Snapshots of a Storage Volume," Inventors: Chatterjee et al.
U.S. Appl. No. 12/042,715, filed Mar. 5, 2008, entitled "Method, System, Apparatus, and Computer-Readable Medium for Taking and Managing Snapshots of a Storage Volume," Inventors: Chatterjee et al.
U.S. Appl. No. 11/695,673, filed Apr. 3, 2007, entitled "Snapshot-Assisted Data Replication," Inventors: Chatterjee et al.
U.S. Appl. No. 12/104,116, filed Apr. 16, 2008, entitled "Writable Snapshots for Boot Consolidation," Inventors: Chatterjee et al.
U.S. Official Action date Mar. 27, 2009 in U.S. Appl. No. 11/695,673.
U.S. Official Action dated Jun. 9, 2010 in U.S. Appl. No. 12/042,705.
U.S. Official Action dated Jul. 8, 2010 in U.S. Appl. No. 12/042,710.
U.S. Official Action dated May 6, 2010 in U.S. Appl. No. 12/042,715.
U.S. Official Action dated Nov. 12, 2010 in U.S. Appl. No. 12/104,116.
U.S. Official Action dated Dec. 1, 2010 in U.S. Appl. No. 12/042,705.
Notice of Allowance dated Mar. 18, 2011 in U.S. Appl. No. 12/042,715.
US 6,988,220, 01/2006, Eng et al. (withdrawn)

* cited by examiner

| Time | Operation | Snapshot Creation | Clean-up Redundancies |
|---|---|---|---|
| t1 | Open File A | | |
| t2 | Write File A | | |
| t3 | Close File A | → Create Snapshot | |
| t4 | Open File B | | |
| t5 | Write File B | | |
| t6 | Close File B | → Create Snapshot | → Delete Snapshot from t3 |
| t7 | Open File C | | |
| t8 | Write File C | | |
| t9 | Close File C | → Create Snapshot | → Delete Snapshot from t6 |
| t10 | Open File A | | |
| t11 | Write File A | | |
| t12 | Close File A | → Create Snapshot | |
| t13 | Open File C | | |
| t14 | Write File C | | |
| t15 | Close File C | → Create Snapshot | → Delete Snapshot from t12 |
| t16 | Open File C | | |
| t17 | Write File C | | |
| t18 | Close File C | → Create Snapshot | |
| t19 | Open File B | | |
| t20 | Write File B | | |
| t21 | Close File B | → Create Snapshot | |
| t22 | Open File A | | |
| t23 | Write File A | | |
| t24 | Close File A | → Create Snapshot | → Delete Snapshots t18 & t21 |

Fig. 2

| Time | Operation | Snapshot Creation | File Closure List |
|------|-----------|-------------------|-------------------|
| t1 | Open File A | | [ ] |
| t2 | Write File A | | |
| t3 | Close File A | ↑ | [A] |
| t4 | Open File B | | |
| t5 | Write File B | | |
| t6 | Close File B | ↑ | [A, B] |
| t7 | Open File C | | |
| t8 | Write File C | | |
| t9 | Close File C | ↑ Create Snapshot | [A, B, C] |
| t10 | Open File A | | [ ] |
| t11 | Write File A | | |
| t12 | Close File A | ↑ | [A] |
| t13 | Open File C | | |
| t14 | Write File C | | |
| t15 | Close File C | ↑ Create Snapshot | [A, C] |
| t16 | Open File C | | [ ] |
| t17 | Write File C | | |
| t18 | Close File C | ↑ | [C] |
| t19 | Open File B | | |
| t20 | Write File B | | |
| t21 | Close File B | ↑ | [C, B] |

Fig. 3

STORAGE SYSTEM SNAPSHOTS FOR CONTINUOUS FILE PROTECTION

CROSS-REFERENCE TO RELATED APPLICATIONS

This application claims the benefit of U.S. provisional patent application No. 60/898,325, filed on Jan. 30, 2007, and entitled "Novel Method to Protect Computer Files on a Continuous Basis in Storage Systems Using Snapshots" which is expressly incorporated herein by reference in its entirety.

BACKGROUND

Data stored on computers may need to be protected from various forms of destruction. While some of these dangers are physical and tangible (for example, failure of a disk drive, fire, or floods), other dangers are intangible or logical (for example, accidental deletion of files, or an attack by a computer virus). Data must be protected from the first category of dangers through physical means, such as remote replication, Redundant Arrays of Inexpensive Disks (RAID), highly-available systems, tape backups, etc. However, such dangers are relatively rare and the second category of inadvertent erasure or modification of data can be the more likely cause for data loss.

Storage systems employ various approaches to protect from intangible or logical losses. For example, solutions may employ file versioning, tape backups, or periodic backup to a remote server. Many of these solutions are periodic, meaning that they may be executed once a day or even less frequently. As such, when data needs to be recovered, there is a data loss that could be as high as the data created during the time period between two backups.

Continuous data protection (CDP) is a paradigm that is increasingly used to protect data on a continuous basis. In most CDP solutions, a backup is made of a file or a folder whenever it is modified. This is often implemented by making a copy of a file each time the file is closed. At recovery time, there may be a graphical or textual interface that allows the user to browse through the various versions of a file that are available, and choose the one that he or she would like to recover.

A trade-off involved in many CDP systems is in the tremendous overhead of space that is often required to store multiple versions of files. For a file of size one gigabyte, for example, each version is also about one Gigabyte. Hence, even 50 versions correspond to a total size of 50 GB. This can be a substantial amount of storage. Such a large quantity of space is needed because the entire file is stored in each version even if only a small portion of the file is changed.

Other systems store only the differential data between versions when a file is closed. Unfortunately, such file version differences can be difficult to browse through, and substantial computing overhead may be required to reconstruct the different versions from the stored difference files. This often makes the process of file recovery needlessly lengthy.

It is with respect to these considerations and others that the disclosure made herein is presented.

SUMMARY

Technologies are described herein for using storage snapshots to provide continuous data protection (CDP) of stored computer information. Through the utilization of the technologies and concepts presented herein, data may be continuously protected by creating snapshots of one or more underlying storage volumes upon certain file system events. Generating snapshots upon every file close event can protect each file in a system with the temporal granularity of each file closing and opening. Removal of redundant snapshots can mitigate the impact on storage capacity when creating large numbers of volume snapshots. Alternatively, generating snapshots whenever a previously closed file is reopened can mitigate storage capacity impact without the creation of redundant snapshots.

Volume snapshots are a feature of some storage systems. Snapshots provide data protection with reduced performance and space overhead. Two examples of snapshot systems are copy-on-write snapshots and redirect-on-write snapshots. Redirect-on-write snapshots can offer significant performance and space benefits over copy-on-write snapshots. A description of redirect-on-write snapshots used herein is found in U.S. patent application Ser. No. 11/417,801, filed on May 4, 2006, assigned to American Megatrends Inc. and incorporated by reference herein in its entirety.

According to one embodiment, an agent can execute continuously to monitor file system events, such as file open, file close, read and write calls, etc. Whenever a "file close" event occurs on a particular file, a file close signal can be generated. The file close signal can be sent to the storage stack on which the file system resides. When the storage stack receives a file close signal, a snapshot of the entire volume may be taken. This can be done before the "file close" call is completed to the application. The agent may also track the number of file writes that have been made to a file since the time that the file was opened, and then skip generation of the file close signal if no writes occurred while the file was open. Thus, only modified files may be considered for triggering snapshot generation.

According to another embodiment, the number of stored snapshots may be reduced by deleting a snapshot that has been rendered redundant by one or more newer snapshots. Since a snapshot may be taken on every file close, there is a possibility that the number of snapshots in the system may become unreasonably large. As an example of redundant snapshot deletion, if snapshot number 500 protects a change in file A, and then snapshot number 501 is made to protect a change in file B, then snapshot 500 may be deleted. This deletion is safe because snapshot 501 also protects file A. The version of file A that was protected by snapshot 500 is also contained in snapshot 501 since no changes have occurred to file A between the time of snapshot 500 and snapshot 501.

According to yet another embodiment, snapshots can be created whenever a previously closed file is reopened. Such a snapshot can protect every file that was closed since the previous snapshot was taken. This protection can be provided without taking a snapshot for each one of the intervening file closures. As such, the need to find and delete redundant snapshots may be avoided.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 2 is a timeline illustrating snapshot creation and clean up events for continuous data protection according to one exemplary embodiment;

FIG. 3 is a timeline illustrating snapshot management using a file closure list according to one exemplary embodiment;

DETAILED DESCRIPTION

Figure 1:
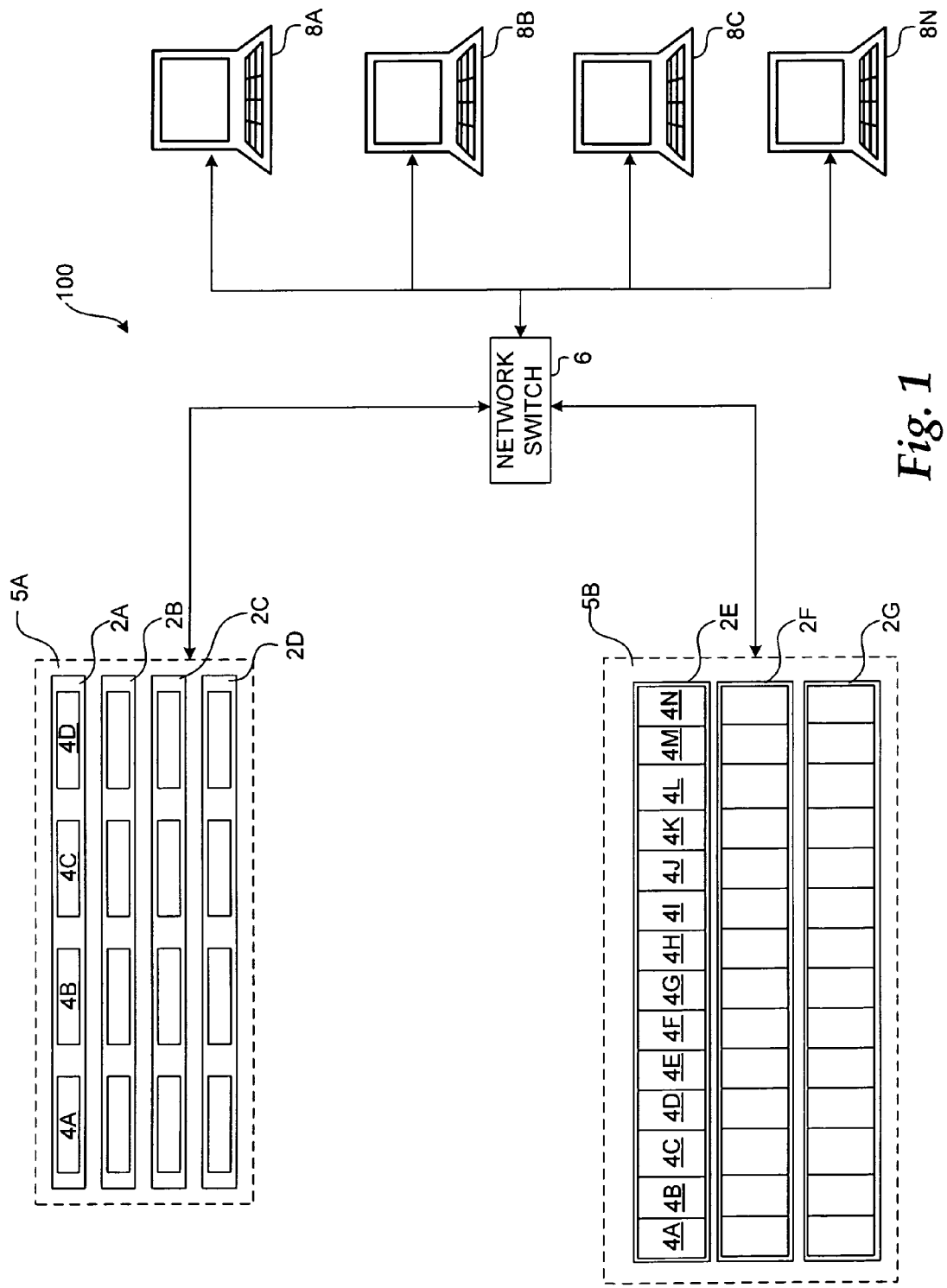
FIG. 1 is a network architecture diagram illustrating aspects of a storage system that includes snapshot capability according to one exemplary embodiment.

The following detailed description is directed to technologies for providing continuous data protection using storage volume snapshots. Through the use of the embodiments presented herein, continuous data protection may be provided in storage systems using file access events to trigger snapshot generation and management processes.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for continuous data protection using storage volume snapshots will be described.

Turning now to FIG. 1, details will be provided regarding an illustrative operating environment for the implementations presented herein, as well as aspects of several software components that provide the functionality described herein for continuous data protection. In particular, FIG. 1 is a network architecture diagram showing aspects of a storage system 100 that includes several virtualized clusters 5A-5B. A virtualized cluster is a cluster of different storage nodes that together expose a single storage device. In the example storage system 100 shown in FIG. 1, the clusters 5A-5B include the storage server computers 2A-2G (also referred to herein as "storage nodes" or a "node") that are operative to read and write data to one or more mass storage devices, such as hard disk drives. The cluster 5A includes the nodes 2A-2D and the cluster 5B includes the nodes 2E-2G. All of the nodes 2 in a cluster 5 can be physically housed in the same rack, located in the same building, or distributed over geographically diverse locations, such as various buildings, cities, or countries.

According to implementations, the nodes within a cluster may be housed in a one rack space unit storing up to four hard disk drives. For instance, the node 2A is a one rack space computing system that includes four hard disk drives 4A-4D. Alternatively, each node may be housed in a three rack space unit storing up to fifteen hard disk drives. For instance, the node 2E includes fourteen hard disk drives 4A-4N. Other types of enclosures may also be utilized that occupy more or fewer rack units and that store fewer or more hard disk drives. In this regard, it should be appreciated that the type of storage enclosure and number of hard disk drives utilized is not generally significant to the implementation of the embodiments described herein. Any type of storage enclosure and virtually any number of hard disk devices or other types of mass storage devices may be utilized.

As shown in FIG. 1, multiple storage nodes may be configured together as a virtualized storage cluster. For instance, the nodes 2A-2D have been configured as a storage cluster 5A and the nodes 2E-2G have been configured as a storage cluster 5B. In this configuration, each of the storage nodes 2A-2G is utilized to field I/O operations independently, but are exposed to the initiator of the I/O operation as a single device. It should be appreciated that a storage cluster may include any number of storage nodes. A virtualized cluster in which each node contains an independent processing unit, and in which each node can field I/Os independently (and route them according to the cluster layout) is called a horizontally virtualized or peer cluster. A cluster in which each node provides storage but the processing and mapping is done completely or primarily in a single node, is called a vertically virtualized cluster.

Data may be striped across the nodes of each storage cluster. For instance, the cluster 5A may stripe data across the storage nodes 2A, 2B, 2C, and 2D. The cluster 5B may similarly stripe data across the storage nodes 2E, 2F, and 2G. Striping data across nodes generally ensures that different I/O operations are fielded by different nodes, thereby utilizing all of the nodes simultaneously, and that the same I/O operation is not split between multiple nodes. Striping the data in this manner provides a boost to random I/O performance without decreasing sequential I/O performance.

According to embodiments, each storage server computer 2A-2G includes one or more network ports operatively connected to a network switch 6 using appropriate network cabling. It should be appreciated that, according to embodiments of the invention, Ethernet or Gigabit Ethernet may be utilized. However, it should also be appreciated that other types of suitable physical connections may be utilized to form a network of which each storage server computer 2A-2G is a part. Through the use of the network ports and other appropriate network cabling and equipment, each node within a cluster is communicatively connected to the other nodes within the cluster. Many different types and number of connections may be made between the nodes of each cluster. Furthermore, each of the storage server computers 2A-2G need not be connected to the same switch 6. The storage server computers 2A-2G can be interconnected by any type of network or communication links, such as a LAN, a WAN, a MAN, a fiber ring, a fiber star, wireless, optical, satellite, or any other network technology, topology, protocol, or combination thereof.

Each cluster 5A-5B is also connected to a network switch 6. The network switch 6 is connected to one or more client computers 8A-8N (also referred to herein as "initiators"). It should be appreciated that other types of networking topologies may be utilized to interconnect the clients and the clusters 5A-5B. It should also be appreciated that the initiators 8A-8N may be connected to the same local area network ("LAN") as the clusters 5A-5B or may be connected to the clusters 5A-5B via a distributed wide area network, such as the Internet. An appropriate protocol, such as the Internet Small Computer Systems Interface ("iSCSI") protocol may be utilized to enable the initiators 8A-8D to communicate with and utilize the various functions of the storage clusters 5A-5B over a wide area network such as the Internet.

Two or more disks 4 within each cluster 5A-5B or across clusters 5A-5B may be mirrored for data redundancy and protection against failure of one, or more, of the disks 4. Examples of the disks 4 may include hard drives, spinning disks, stationary media, non-volatile memories, or optically scanned media; each, or in combination, employing magnetic, capacitive, optical, semiconductor, electrical, quantum, dynamic, static, or any other data storage technology. The disks 4 may use IDE, ATA, SATA, PATA, SCSI, USB, PCI, Firewire, or any other bus, link, connection, protocol, network, controller, or combination thereof for I/O transfers.

Storage volume snapshots and continuous data protection features may be provided on one or more storage server computers 2A-2G, one or more storage clusters 5A-5B, or one or more client computers 8A-8N. Furthermore, the processes for implementing CDP or snapshots for CDP may execute on any of these systems or may operate in a distributed fashion with components executing across two or more of these systems.

Referring now to FIG. 2, a timeline 200 for snapshot creation and clean up events is illustrated. Continuous data protection is provided on one or more storage server computers 2A-2B employing storage volume snapshots according to one exemplary embodiment. The timeline 200 lists file system events progressing forward in time 210. Each event is labeled with a time 210 and a description of the operation 220 occurring at that time 210. Some operations 220 result in snapshot creation 230 and/or redundant snapshot deletion 240.

An agent can take the form of a driver, or filter driver, that operates with the file system to trap all file-system calls before the calls are fielded by the file system drivers. The agent can listen for specific operations 220 such as file open and file close calls. When a file open operation 220 is trapped, the agent can begin tracking for file writes operations 220 and for file closure operations 220. If intervening writes occur to the file, and the file is subsequently closed (for example because of a save command, or because the application shuts down), the file close operation 220 can trigger a snapshot creation 230 event to the lower layer storage system. The snapshot creation 230 event can be done after the file close operation 220 has been successfully performed by the file system. This can allow for the snapshot to be taken only after the file system is in a consistent state. That is, after the file has been properly closed without any cached data or open file handles.

The procedure described above may be performed on almost all contemporary operating systems, though the operational instructions may vary for each of them. Moreover, if the disclosure presented herein is deployed in a Network Accessed Storage (NAS) system, it can be executed at the level of the file system that is implemented at that level, such as XFS. All client computer 8 close file calls, regardless of the client operating system, will eventually map to file close operations 220 at the storage system level. As a result, the system may function consistently without concern for the operating system in use.

Lengthy recovery processes are not desirable in effective CDP implementations. Backup solutions, in general, and CDP solutions in particular, may be characterized by two metrics. The first metric is the Recovery Time Objective (RTO) and the second is the Recovery Point Objective (RPO). RTO refers to the amount of time that is spent restoring a file from a backup. RPO refers to the exposure to data loss between backups, that is, the amount of data that is at risk for loss between the latest revision of a file and the last backed-up version. It is desirable to minimize both the RPO and the RTO. If possible, decreasing the RPO to zero may be desirable. An RPO of zero implies that there is no data lost when recovering from a backup.

A snapshot system using redirect-on-write snapshots can be used in one embodiment presented herein. A redirect-on-write snapshot system can provide the advantage of taking snapshots almost instantaneously. The snapshots may also be rolled back within one second, and multiple snapshots can be mounted and browsed simultaneously. The snapshots can also be mounted in writable mode providing snapshot branches suitable for performing experiments and tests before rolling the snapshot back into the production storage system. For a redirect-on-write snapshot architecture, the act of taking a snapshot may not require any immediate resource commitment in terms of space or memory. Thus, there may be little or no impact on the performance or available capacity of the system when the snapshot is taken.

When redirect-on-write snapshots are used, the operation of taking a snapshot can be very fast and may account for little or no CPU time delay during the file close operation 220. If the client application or the user is working on multiple files at once, those files may be frozen momentarily while a snapshot is taken at a particular file close event. Thus, the files can be protected continuously on every file close operation 220 and copies of any files used by the system can be stored at multiple snapshots.

In FIG. 2, files are closed at times t3, t6, t9, t12, t15, t18, t21, and t24. At those times 210, the agent can trigger a snapshot creation 230 so that consistent copies of the files can be preserved in the snapshots for each modification of a file as it is closed. Triggering snapshot creation 230 at each file closure operation 220 can cause a single instance of a modified file to be protected by multiple snapshots. This implies that some of the snapshots may have been made redundant by newer snapshots. For example, the version of File A closed at time t3 is protected by the snapshot created at time t3, but the snapshot created at time t6 also contains the same version of File A, since File A was not modified between time t3 and time t6. This protection redundancy can trigger a redundant snapshot deletion 240 at time t6. At time t6, the snapshot created at time t3 may be safely deleted.

Considering a similar example, the snapshot created at time t24 contains the same version of File C as the snapshot created at time t18 since File C was not modified between time t18 and time t24. The snapshot created at time t24 also contains the same version of File B as the snapshot created at time t21, since File B was not modified between time t21 and time t24. Thus, at time t24, the snapshot created at time t18 and the snapshot created at time t21 may both be safely deleted.

Considering a counter example, the snapshot created at time t18 has a new version of File C in it, but the previous version of File C is still being protected by the snapshot created at time t15. As such, no snapshot can be safely deleted at time t18. Additional detail of using file closure operations 220 to manage snapshot creation 230 is discussed below with respect to FIG. 4 and FIG. 5.

Since, in one embodiment, a snapshot may be taken on every file close, there is a possibility that the number of snapshots in the system may become unreasonably large. The number of snapshot may even exceed the limits supported by the storage system. As discussed herein, snapshots can be managed in attempt to reduce the number of snapshots that is required to protect the files in the storage system. The number of stored snapshots may be reduced by deleting a snapshot that has been rendered redundant by one or more newer snapshots. The process of deciding whether there have been changes in specific files, and thus whether a snapshot can be deleted or not, may be handled in a separate program thread or as a background process. Such threading may mitigate any interference by snapshot deletion to the inline I/O and file operations which may have tighter real-time requirements.

The CDP agent can detect the redundant snapshots on the fly and delete such snapshots in an attempt to minimize the number of snapshots used to protect the files in the storage system. The decision of whether or not a snapshot is redundant, may be made, in part, by examining the date of modification of the files on the file system. Metadata can also be stored to associate each snapshot with the name of the file whose closure it was protecting, and the time at which the snapshot was taken.

If a user needs to recover a file from the CDP system, the restore operation can be quite simple. Likewise, if the user wants to view a file that was saved one hour earlier, then all of the snapshots taken during the last hour can be searched. If file recovery is required, a user interface can list snapshots which have unique instances of a specified file. These snapshots can be identified by referring to the specified file's last modification time. Such modification time stamps may be maintained by file system metadata. File changes can also be identified by changes in file size and changes in the last modification time when compared to other instances of the specific file.

Backup data that is generated in CDP implementations may be stored either locally (i.e., on the machine that stores the original files), or remotely (i.e., on a machine that is kept in a different location). Both choices have their advantages. While local backups are usually much faster to recover from, remote backups remain available even when there is a physical incident such as a fire or a system failure. Embodiments presented herein may support both local backups for recently modified data, and remote backups in case of a disaster.

A remote backup may be performed from the snapshot by attaching a tape drive. Alternatively, a remote replication link can be employed between the primary system on which the file is stored and a remote backup system. Based on a schedule, or availability of connectivity, the storage system can be set up to back up files stored in the snapshots. One advantage of backing up files from snapshots can be that the backup operation can continue even when inline I/O operations are active. That is, there may be no need to take down the system to perform the backup operation.

Snapshots, as discussed herein, may be stored on a local system to provide a method of local backup. Additionally, snapshots can be seamlessly and transparently backed up to remote storage, either via a replication link, or through a removable storage device such as a tape drive.

If a file corruption or erasure is detected, and a file can be recovered from a local backup, the snapshots that are relevant to the file being recovered may be identified by a user. This identification may be based on the time that the data corruption occurred. Recovery decisions may be facilitated by opening multiple snapshots to allow the files within the snapshots to be compared to one another. If the user is attempting to roll back a single file, this file may be manually copied from the snapshot to the volume. If the user is attempting to roll back the entire volume, this can be done after identifying the desired snapshot to roll back to. In addition, before rolling back the snapshot, the user may mount the snapshot in writable mode and perform any test runs to make sure that the volume will operate smoothly after the rollback has been performed.

An effective CDP solution must maintain high performance. Generally, performance is a compromise in contemporary CDP solutions, since performance decreases when copies are being made of a file on every file close. This can introduce a high degree of additional background load, which can decrease application responsiveness, and also accelerate the failure of storage components such as disk drives.

Additionally, an ideal CDP solution should be deployable on both servers, and user systems such as desktop workstations or notebook computers. Recent surveys have shown that up to 60% of corporate data is stored on user workstations or notebook computers. As such, it is undesirable for a CDP solution to protect server files while ignoring files stored on user workstations or notebook computers.

Files discussed herein may be contained in a file system that is hosted by a storage system implementing a snapshot architecture such as that described above. The files may be accessed continuously by one or more users through a computer operating system such as MICROSOFT WINDOWS, UNIX, MAC OS, or LINUX.

Referring now to FIG. 3, a timeline 300 illustrates snapshot management using a file closure list 340 according to one exemplary embodiment. Here, a file closure list 340 can be used to identify the need for snapshot creation 330 without the need to monitor for redundant snapshots to be deleted. The timeline 300 lists file system events progressing forward in time 310. Each event is labeled with a time 310 and a description of the operation 320 occurring at that time 310. File close operations 320 result in updates being made to the file closure list 340. File open operations 320 may result in snapshot creation 330 and clearing of the file closure list 340 as long as the filing being opened is listed in the file closure list 340 prior to the file open operation 320.

For example, the closing of File A at time t3 causes File A to be added to the previously empty file closure list 340. The closing of File B at time t6 causes File A to be added to the file closure list 340 which now contains A and B. The closing of File C at time t9 causes File C to be added to the file closure list 340 which now contains A, B, and C. Note that the open file operations at times t1, t4, and t7 did not trigger snapshot creation 330. This is because the file being opened at those three times was not already listed in the file closure list. That is, the file being opened had not been closed since the last snapshot and thus was not in need of protection through a new snapshot creation 330. In contrast, the open file operation 320 at time t10 relates to File A. File A is already in the file closure list 340. Thus, a snapshot creation 330 event can be triggered at time t10 to protect the previously closed File A before opening a new version of File A. Since the snapshot generated at time t10 protects all of the previously closed files, the file closure list 340 can be cleared at this time.

Since the use of the file closure list 340 can prevent the generation of redundant snapshots, there may be no need to test for redundant snapshots to be deleted as discussed with respect to FIG. 2. Further detail of using file closure lists 340 to manage snapshot creation 330 is discussed below with respect to FIG. 6.

Figure 4:
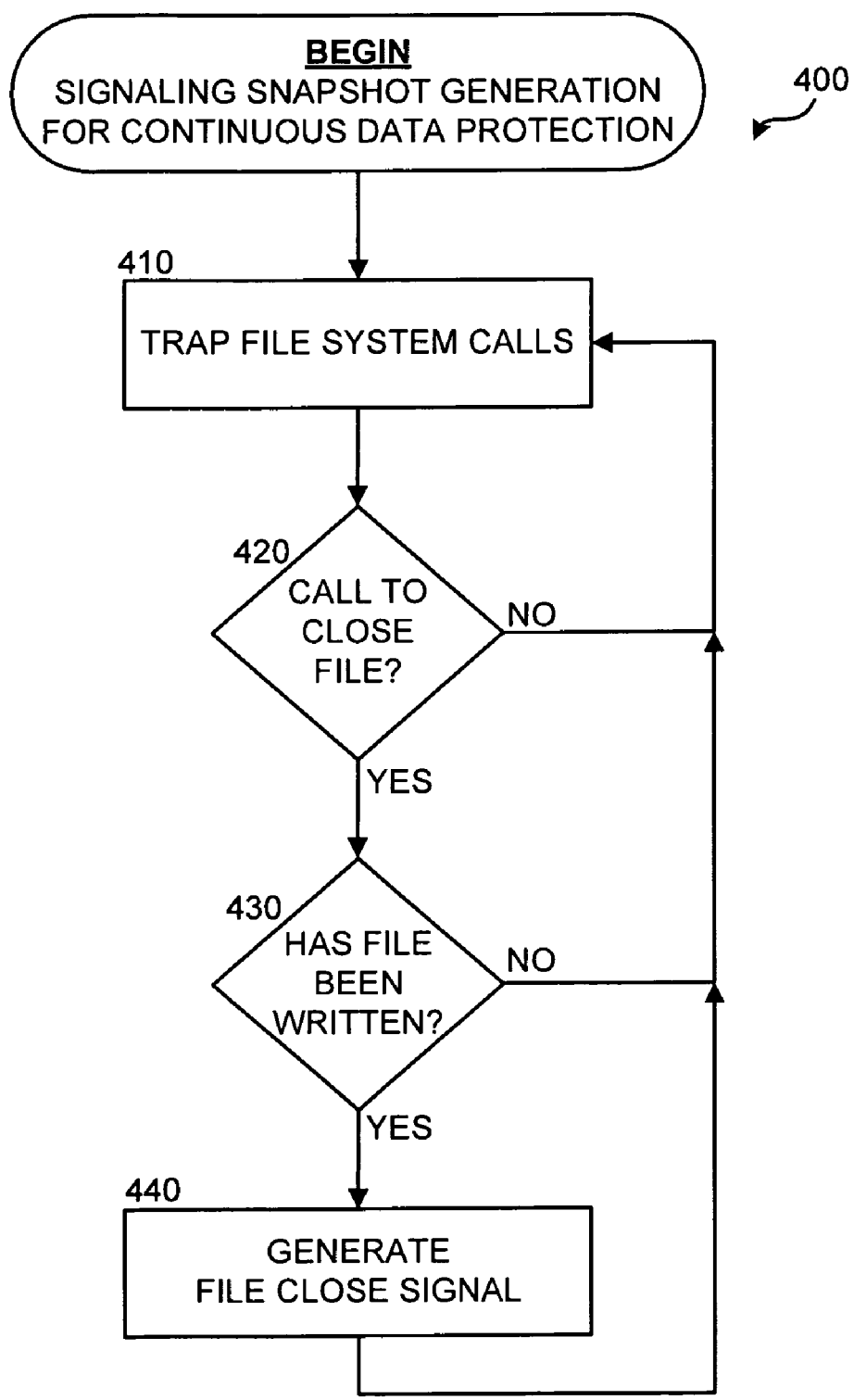
FIG. 4 is a logical flow diagram illustrating a process for signaling snapshot generation for continuous data protection according to one exemplary embodiment.

Turning now to FIG. 4, additional details will be provided regarding the embodiments presented herein for continuous file protection using storage snapshots. In particular, FIG. 4 is a flow diagram showing a routine 400 that illustrates aspects of an exemplary process for signaling snapshot generation for continuous data protection. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

The routine 400 can begin with operation 410 where a file system call, or file system operation 220 is trapped. Typically, file system operations 220 can be requests to open, close, read, or write to a file. Next, at operation 420 the file system operation 220 that was trapped at operation 410 can be evaluated to establish if it is a file close operation 220 or not. If the file system operation 220 is not a file close operation 220, then the routine 400 can return to operation 410 to trap the next file operation 220. Otherwise, if the file system operation 220 is indeed a file close operation 220, then the routine 400 can continue to operation 430.

At operation 430 the file being closed by the file close operation 220 is evaluated to determine if the file was written while it was open. If the file was not written to, the routine 400 can return to operation 410 to trap the next file operation 220. Otherwise, if the file was indeed written to, the routine 400 can continue to operation 440.

At operation 440, a file closure signal is generated. This file closure signal is discussed in further detail with respect to FIG. 5. After operation 440, the routine 400 can return to operation 410 to trap the next file operation 220.

Figure 5:
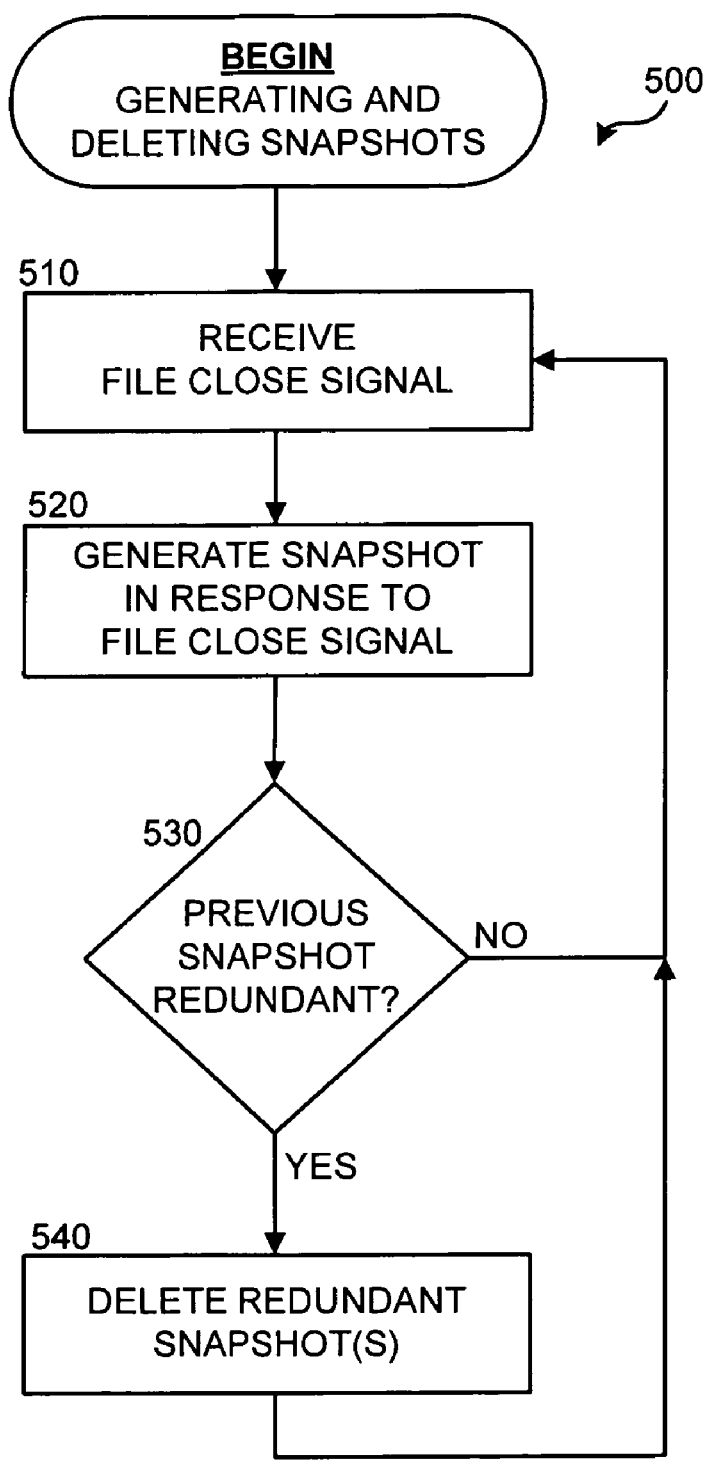
FIG. 5 is a logical flow diagram illustrating a process for generating and deleting snapshots according to one exemplary embodiment.

Turning now to FIG. 5, additional details will be provided regarding the embodiments presented herein for continuous file protection using storage snapshots. In particular, FIG. 5 is a flow diagram illustrating a routine 500 that shows aspects of an exemplary process for generating and deleting snapshots according to one exemplary embodiment.

The routine 500 can begin with operation 510 where a file closure signal can be received. Such a file closure signal may be generated by operation 440 as discussed above. The file closure signal can indicate that a file has been written to and then closed and thus a snapshot should be taken to protect the newly written changes to the file.

Next, at operation 520, a snapshot is generated in response to the file closure signal received in operation 510. The storage volume snapshot can be performed using the underlying snapshot features of the storage system. The snapshot can be a copy-on-write snapshot or a redirect-on-write snapshot. However, redirect-on-write snapshots can offer significant performance and space benefits over copy-on-write snapshots, as previously discussed.

Operation 530 can evaluate if any previous snapshots have been rendered redundant by the new snapshot taken in operation 520. Any previous snapshot that was made to protect a version of a file that is also protected in the new snapshot has been rendered redundant and can be safely deleted without any loss of data protection. If the evaluation at operation 530 determines that no previous snapshots have been rendered redundant, then the routine 500 can return to operation 510 to receive the next file closure signal. Otherwise, if one or more snapshots have been rendered redundant by the snapshot newly created in operation 520, then the routine 500 can continue to operation 540.

At operation 540, the one or more snapshots that were determined by operation 530 to have been rendered redundant by the snapshot newly created in operation 520 can be deleted. Deleting redundant snapshots can prevent the storage system from exceeding the maximum number of snapshots that can be stored in the system. Such deletions may also reduced needlessly repeated data thereby freeing up storage capacity. After operation 540, the routine 500 can return to operation 510 to receive the next file closure signal.

Figure 6:
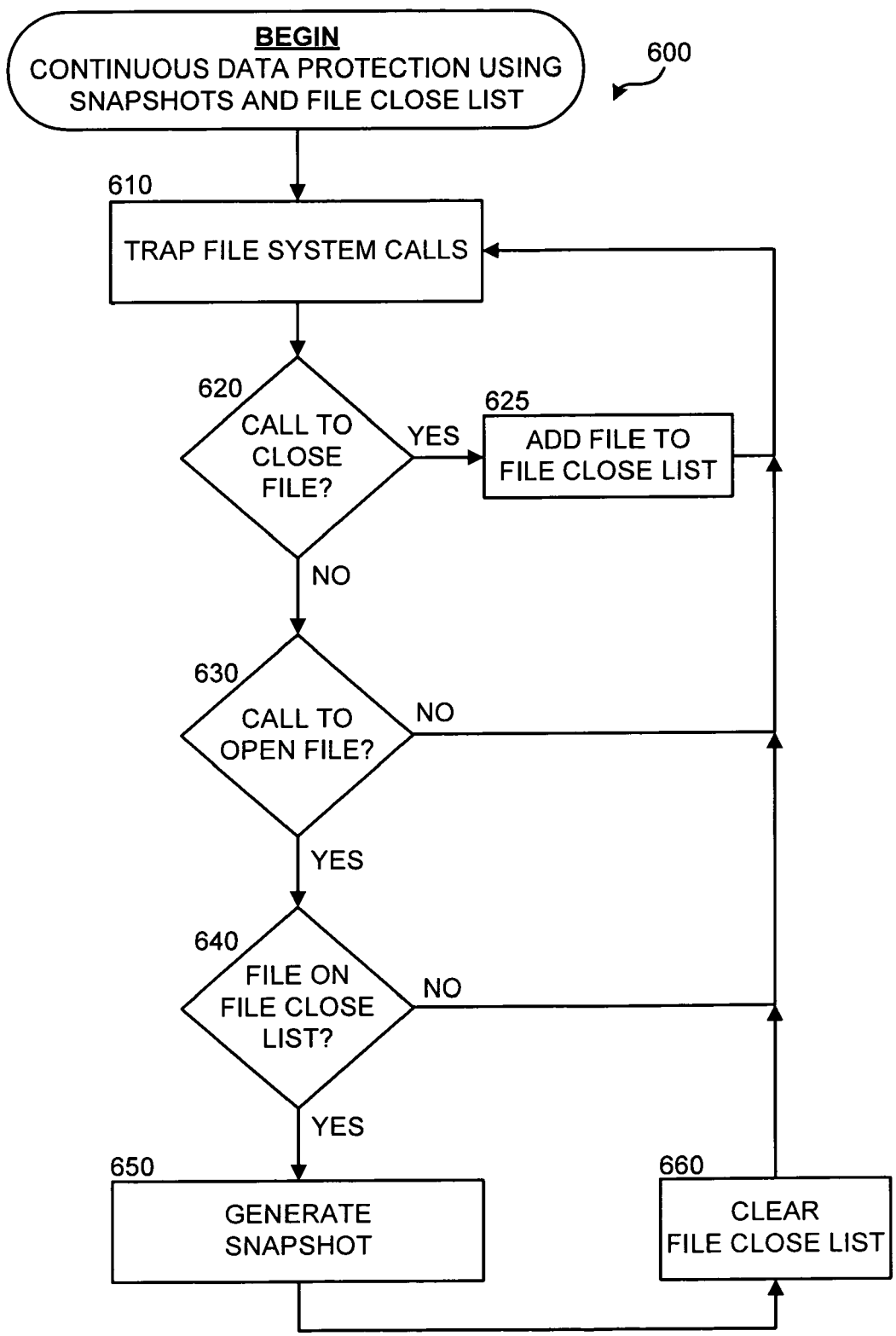
FIG. 6 is a logical flow diagram illustrating a process for continuous data protection using snapshots and file closure lists according to one exemplary embodiment.

Turning now to FIG. 6, additional details will be provided regarding the embodiments presented herein for continuous file protection using storage snapshots. In particular, FIG. 6 is a flow diagram illustrating a routine 600 that shows aspects of an exemplary process for continuous data protection using snapshots and file closure lists according to one exemplary embodiment.

The routine 600 can begin with operation 610 where a file system call, or file system operation 320 is trapped. Typically, a file system operation 320 can be a request to open, close, read, or write to a file. Next, at operation 620, the file system operation 320 that was trapped at operation 610 can be evaluated to establish if it is a file close operation 320 or not.

If the file system operation 320 is evaluated at operation 620 to indeed be a file close operation 320, then the routine 600 can continue to operation 625. At operation 625, an indicator related to the file that is being closed can be added to the file closure list 340. The indicator may be the file's name, path, URL, file pointer, or any other identifier of the file. After the addition is made to the file closure list 340, the routine 600 can return to operation 610 to trap the next file system call.

If file system operation 320 is evaluated at operation 620 to not be a file close operation 320, then the routine 600 can continue to routine 630. Next, at operation 630, the file system operation 320 that was trapped at operation 610 can be evaluated to establish if it is a file open operation 320 or not. If the file system operation 320 is evaluated at operation 630 to not be a file open operation 320, then the routine 600 can return to operation 610 to trap the next file system call. Otherwise, if the file system operation 320 is evaluated at operation 630 to indeed be a file open operation 320, then the routine 600 can continue to operation 640.

At operation 640, file being opened is evaluated to determine if an indicator of the file is contained in the file closure list 340. If the file being opened is not contained in the file closure list 340, then the routine 600 can return to operation 610 to trap the next file system call. Otherwise, if the file being opened is indeed contained in the file closure list 340, then the routine 600 can continue to operation 650.

At operation 650, a snapshot is generated to protect the previous closure of the file before opening the file for additional modification. The storage volume snapshot can be performed using the underlying snapshot features of the storage system. The snapshot can be a copy-on-write snapshot or a redirect-on-write snapshot. However, redirect-on-write snapshots can offer significant performance and space benefits over copy-on-write snapshots, as previously discussed.

Next, at operation 660, the file closure list 340 can be cleared. The file closure list 340 can be cleared since the snapshot newly generated in operation 650 is protecting all of the files closed since the previous snapshot was made. After clearing the file closure list 340, the routine 600 can return to operation 610 to trap the next file system call.

Figure 7:
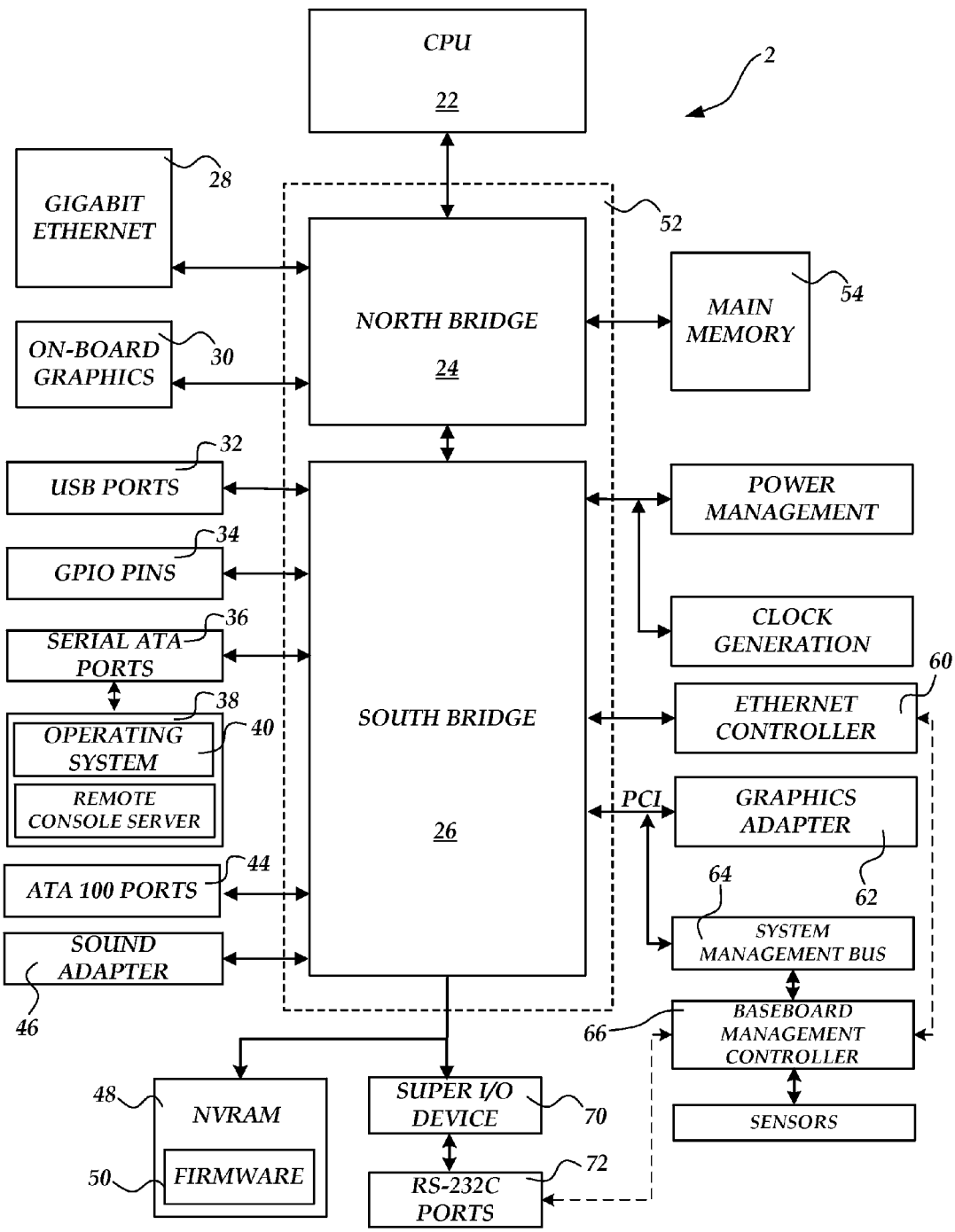
FIG. 7 is a computer architecture diagram illustrating a computer hardware architecture for a computing system capable of continuous data protection using snapshots according to one exemplary embodiment.

FIG. 7 and the following discussion are intended to provide a brief, general description of a suitable computing environment in which the embodiments described herein may be implemented. While the technical details are presented herein in the general context of program modules that execute in conjunction with the execution of an operating system, those skilled in the art will recognize that the embodiments may also be implemented in combination with other program modules.

Generally, program modules include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

In particular, FIG. 7 shows an illustrative computer architecture for a storage server computer 2 that may be utilized in the implementations described herein. Such an illustrative computer system may also describe a client computer system 8A-8N. The storage node computer 2 includes a baseboard, or "motherboard", which is a printed circuit board to which a multitude of components or devices may be connected by way of a system bus or other electrical communication paths. In one illustrative embodiment, a CPU 22 operates in conjunction with a chipset 52. The CPU 22 is a standard central processor that performs arithmetic and logical operations necessary for the operation of the computer. The storage node computer 2 may include a multitude of CPUs 22.

The chipset 52 includes a north bridge 24 and a south bridge 26. The north bridge 24 provides an interface between the CPU 22 and the remainder of the computer 2. The north bridge 24 also provides an interface to a random access memory ("RAM") used as the main memory 54 in the computer 2 and, possibly, to an on-board graphics adapter 30. The north bridge 24 may also include functionality for providing networking functionality through a gigabit Ethernet adapter 28. The gigabit Ethernet adapter 28 is capable of connecting the computer 2 to another computer via a network. Connections which may be made by the network adapter 28 may include LAN or WAN connections. LAN and WAN networking environments are commonplace in offices, enterprise-wide computer networks, intranets, and the internet. The north bridge 24 is connected to the south bridge 26.

The south bridge 26 is responsible for controlling many of the input/output functions of the computer 2. In particular, the south bridge 26 may provide one or more universal serial bus ("USB") ports 32, a sound adapter 46, an Ethernet controller 60, and one or more general purpose input/output ("GPIO") pins 34. The south bridge 26 may also provide a bus for interfacing peripheral card devices such as a graphics adapter 62. In one embodiment, the bus comprises a peripheral component interconnect ("PCI") bus. The south bridge 26 may also provide a system management bus 64 for use in managing the various components of the computer 2. Additional details regarding the operation of the system management bus 64 and its connected components are provided below.

The south bridge 26 is also operative to provide one or more interfaces for connecting mass storage devices to the computer 2. For instance, according to an embodiment, the south bridge 26 includes a serial advanced technology attachment ("SATA") adapter for providing one or more serial ATA ports 36 and an ATA 100 adapter for providing one or more ATA 100 ports 44. The serial ATA ports 36 and the ATA 100 ports 44 may be, in turn, connected to one or more mass storage devices storing an operating system 40 and application programs, such as the SATA disk drive 38. As known to those skilled in the art, an operating system 40 comprises a set of programs that control operations of a computer and allocation of resources. An application program is software that runs on top of the operating system software, or other runtime environment, and uses computer resources to perform application specific tasks desired by the user.

According to one embodiment of the invention, the operating system 40 comprises the LINUX operating system. According to another embodiment of the invention the operating system 40 comprises the WINDOWS SERVER operating system from MICROSOFT CORPORATION. According to another embodiment, the operating system 40 comprises the UNIX or SOLARIS operating system. It should be appreciated that other operating systems may also be utilized.

The mass storage devices connected to the south bridge 26, and their associated computer-readable media, provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed by the computer 2. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

A low pin count ("LPC") interface may also be provided by the south bridge 6 for connecting a "Super I/O" device 70. The Super I/O device 70 is responsible for providing a number of input/output ports, including a keyboard port, a mouse port, a serial interface 72, a parallel port, and other types of input/output ports. The LPC interface may also connect a computer storage media such as a ROM or a flash memory such as a NVRAM 48 for storing the firmware 50 that includes program code containing the basic routines that help to start up the computer 2 and to transfer information between elements within the computer 2.

As described briefly above, the south bridge 26 may include a system management bus 64. The system management bus 64 may include a BMC 66. In general, the BMC 66 is a microcontroller that monitors operation of the computer system 2. In a more specific embodiment, the BMC 66 monitors health-related aspects associated with the computer system 2, such as, but not limited to, the temperature of one or more components of the computer system 2, speed of rotational components (e.g., spindle motor, CPU Fan, etc.) within the system, the voltage across or applied to one or more components within the system 2, and the available or used capacity of memory devices within the system 2. To accomplish these monitoring functions, the BMC 66 is communicatively connected to one or more components by way of the management bus 64. In an embodiment, these components include sensor devices for measuring various operating and performance-related parameters within the computer system 2. The sensor devices may be either hardware or software based components configured or programmed to measure or detect one or more of the various operating and performance-related parameters. The BMC 66 functions as the master on the management bus 64 in most circumstances, but may also function as either a master or a slave in other circumstances. Each of the various components communicatively connected to the BMC 66 by way of the management bus 64 is addressed using a slave address. The management bus 64 is used by the BMC 66 to request and/or receive various operating and performance-related parameters from one or more components, which are also communicatively connected to the management bus 64.

It should be appreciated that the computer 2 may comprise other types of computing devices, including hand-held computers, embedded computer systems, personal digital assistants, and other types of computing devices known to those skilled in the art. It is also contemplated that the computer 2 may not include all of the components shown in FIG. 7, may include other components that are not explicitly shown in FIG. 7, or may utilize an architecture completely different than that shown in FIG. 7.

Based on the foregoing, it should be appreciated that technologies for continuous data protection using storage system snapshots are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for providing continuous data protection, the method comprising:
   trapping a file system call;
   evaluating if the trapped file system call is associated with a file that has been modified;
   generating a storage snapshot in response to the file having been modified;
   determining if a previous storage snapshot has been rendered redundant by generating the storage snapshot; and
   deleting the previous storage snapshot if the previous storage snapshot has been rendered redundant.

2. The method of claim 1, further comprising providing a file closure list.

3. The method of claim 2, further comprising adding the file to the file closure list if the trapped file system call is a file close operation.

4. The method of claim 2, wherein evaluating if the trapped file system call is associated with the file that has been modified comprises determining that the trapped call is a file open operation while the file is in the file closure list.

5. The method of claim 2, further comprising clearing the file closure list after generating the snapshot.

6. The method of claim 1, wherein evaluating if the trapped file system call is associated with the file that has been modified comprises determining that the trapped call is a file close operation.

7. A method for providing continuous data protection, the method comprising:
   trapping a file system call;
   evaluating if the trapped file system call is associated with a file that has been modified;
   generating a storage snapshot in response to the file having been modified;
   determining if a previous storage snapshot has been rendered redundant by generating the storage snapshot,
   wherein determining that the previous storage snapshot has been rendered redundant comprises identifying that a version of a file protected by the previous storage snapshot is also protected by generating the storage snapshot.

8. A computer storage medium having computer-executable instructions stored thereon which, when executed by a computer system, cause the computer system to:
   trap a file system call;
   evaluate if the trapped file system call is associated with a file that has been modified;
   generate a storage snapshot in response to the file having been modified;
   determine if a previous storage snapshot has been rendered redundant by generating the storage snapshot; and
   causing the computer system to delete the previous storage snapshot if the previous storage snapshot has been rendered redundant.

9. The computer storage medium of claim 8, further comprising causing the computer system to provide a file closure list.

10. The computer storage medium of claim 9, further comprising causing the computer system to add the file to the file closure list if the trapped file system call is a file close operation.

11. The computer storage medium of claim 9, wherein evaluating if the trapped file system call is associated with the file that has been modified comprises determining that the trapped call is a file open operation while the file is in the file closure list.

12. The computer storage medium of claim 9, further comprising causing the computer system to clear the file closure list after generating the snapshot.

13. The computer storage medium of claim 8, wherein evaluating if the trapped file system call is associated with the file that has been modified comprises determining that the trapped call is a file close operation.

14. A computer storage medium having computer-executable instructions stored thereon which, when executed by a computer system, cause the computer system to:
   trap a file system call;
   evaluate if the trapped file system call is associated with a file that has been modified;
   generate a storage snapshot in response to the file having been modified; and determine if a previous storage snapshot has been rendered redundant by generating the storage snapshot, wherein determining that the previous storage snapshot has been rendered redundant comprises identifying that a version of a file protected by the previous storage snapshot is also protected by generating the storage snapshot.

* * * * *